3 Sheets--Sheet 2.

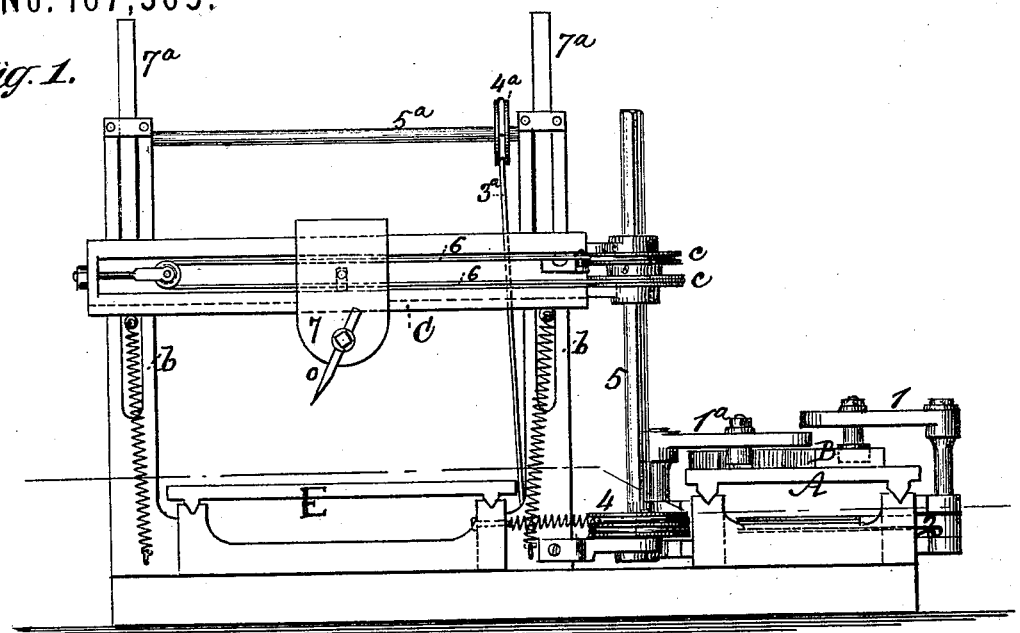

W. H. THOMPSON.
Machine for Dressing Stone.

No. 167,365.  Patented Aug. 31, 1875.

Witnesses
John Becker
F. Haynes

W. H. Thompson
by his Attorneys
Brown & Allen

N. PETERS, PHOTO-LITHOGRAPHER, WASHINGTON, D. C.

3 Sheets--Sheet 3.
W. H. THOMPSON.
Machine for Dressing Stone.
No. 167,365. Patented Aug. 31, 1875.
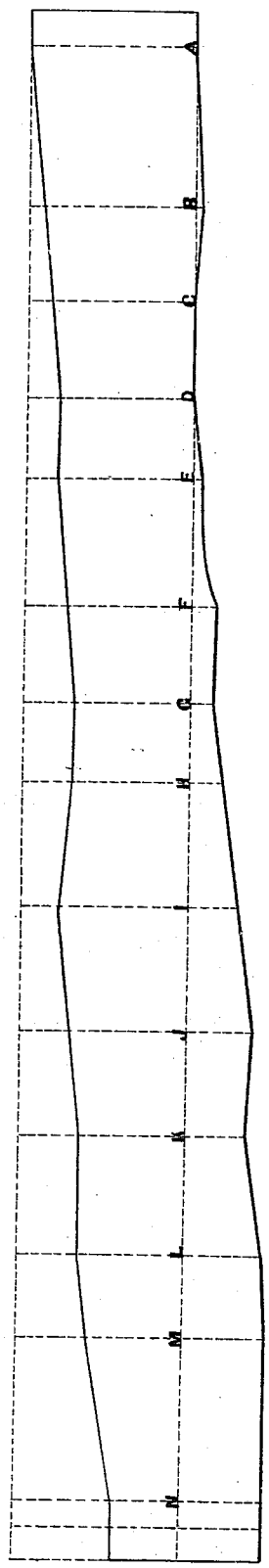
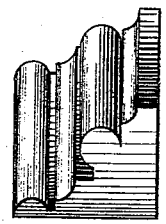
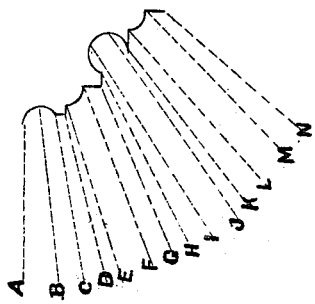
Fig. 5.
Fig. 6.
Fig. 6.
Witnesses
John Becker
Fred. Haynes
W. H. Thompson
by his Attorneys
Brown & Allen

UNITED STATES PATENT OFFICE.

WILLIAM HENRY THOMPSON, OF ISLINGTON, ENGLAND.

IMPROVEMENT IN MACHINES FOR DRESSING STONE.

Specification forming part of Letters Patent No. 167,365, dated August 31, 1875; application filed June 11, 1875.

*To all whom it may concern:*

Be it known that I, WILLIAM HENRY THOMPSON, of Islington, in the county of Middlesex, England, engineer, have invented certain Improvements in Machinery for Cutting, Working, or Operating upon Stone, Wood, and other materials, of which the following is a specification:

This invention relates to improvements in machinery for cutting, working, or operating upon stone, wood, and other materials, the cutting or operating tools being governed in their action upon the various transverse sectional portions of a molding or other form of cutting by means of a developing form guiding or pattern surface, which acts through suitable mechanism to guide or determine the position of the cutting or other working tools while in action.

For this purpose the form or sectional outline of the molding or other shaped work required to be cut or worked is developed or represented by suitable surfaces upon a horizontal plane circle or otherwise, so as to form a guiding or pattern surface, which acts to govern the movements of the cutting-tools, levers, chains, quadrants, and other suitable gear being employed for transmitting the controlling motion to the cutting or other operating tools. The levers are fitted with friction-rollers that bear upon the guiding surfaces of the developing form or pattern surface, and by the adjustment of these friction-rollers at variable distances from the center, upon which the levers radiate, the molding or other shaped design to be cut or produced may be worked to any required size.

In cutting or working curved or irregular forms I employ a guide, template, or counterpart, corresponding to the form in which the material is required to be worked. This guide may be attached to, and work with, the traveling bed, carrying the material to be operated upon; but it is preferable to work it with a separate motion and communicate the form of the template or guide to the working tools by means of a lever fitted with adjustable rollers, as previously described.

And in order that my invention may be clearly understood and readily carried into practice, I will proceed to describe the drawings hereto annexed, which show views of machinery arranged and constructed in accordance with my invention.

Figure 3:
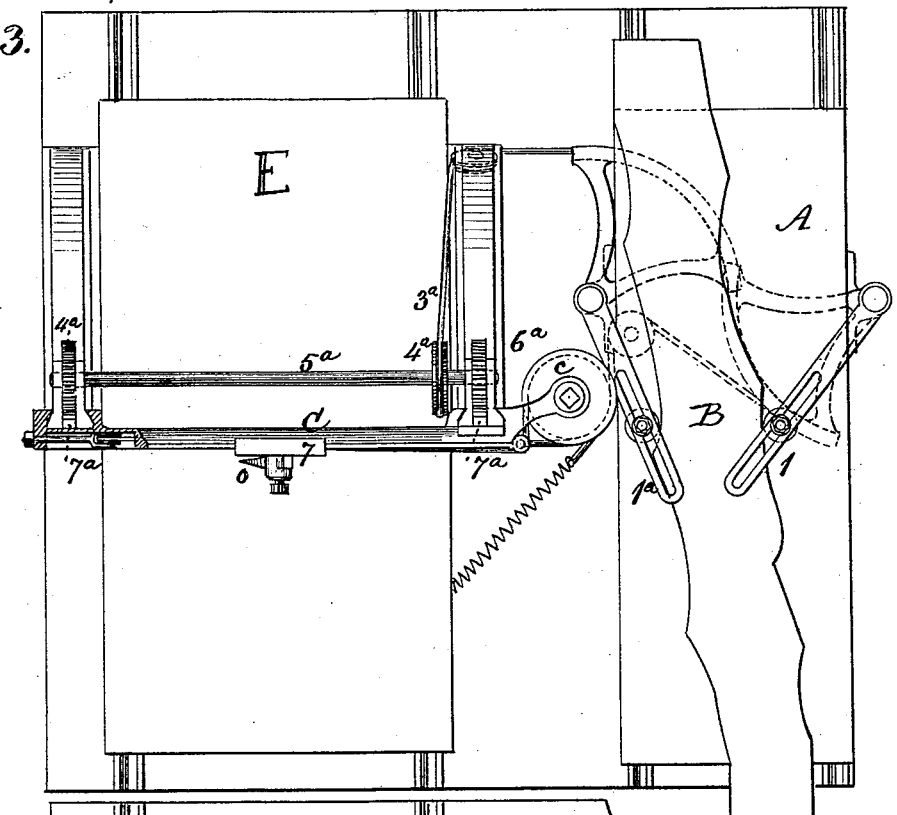
Figure 4:
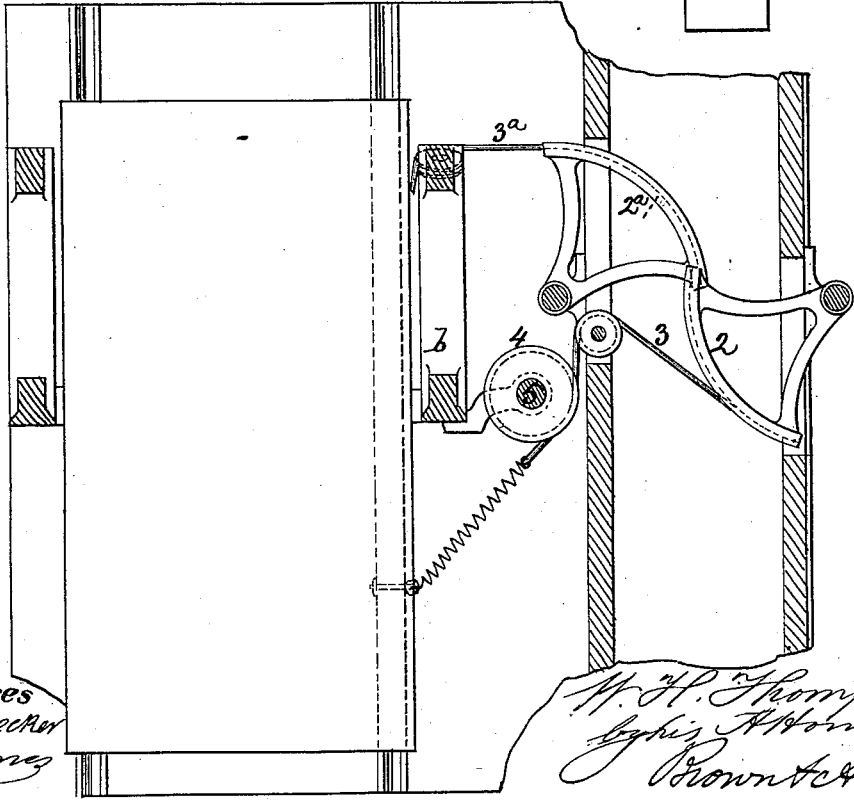

Figure 1 is a front view of a machine constructed according to my invention. Fig. 2 is a side view of the same. Fig. 3 is a top view. Fig. 4 is a horizontal section. Figs. 5, 6, and 7 are detail views, hereinafter particularly referred to.

A is the traveling bed or platform carrying the developing form or pattern surface B, which latter, owing to its form or outline, transmits the requisite motion to the cutting-tool o by means of the levers 1 and 1ª, in order to produce the form of molding or other design required. The transverse motion is communicated to the cutting-tool by means of the lever 1, to the pivot or shaft of which is attached a quadrant, 2. To the quadrant 2 is attached one end of a chain, 3, which passes around a wheel, 4, and has its other end connected by a spring with a fixed portion of the frame of the machine, in order to retract it when the pressure upon the lever 1 is released. The wheel 4 is rigidly attached to a vertical shaft, 5, to which a rotary motion is imparted by the chain 3 passing around the wheel 4. From the base of the machine rise two standards, b b, upon which a cross-beam, C, is arranged to slide vertically. On the cross-beam C a saddle, 7, is arranged to slide horizontally, and carries an adjustable cutting-tool, o. From the end of the cross-beam C, nearest the shaft 5, extend two arms in which are bearings for two pulleys, c c. These pulleys are fitted on the shaft 5 by a spline and feather, so as to turn with said shaft, and be allowed to slide vertically thereon. A chain, 6, is attached to, and passed around, one of the pulleys c; thence horizontally along in front of the cross-beam C around a pulley near the opposite end of said cross-beam, and thence back to the other pulley c, to which it is attached and passed around in a direction opposite to that on the first pulley. In its passage along in front of the cross-beam the chain 6 is clamped or otherwise attached to the saddle 7. The lever 1 is provided with a friction-pulley, which bears against one edge of the pattern B. As the bed A is moved in its seat the pressure of the edge of the pattern B against the lever 1 causes said lever to vibrate in one direction or the other, and thus, through the quadrant 2, chain 3, and wheel 4, to rotate the shaft 5 and pulleys $c$ $c$, and cause the chain 6 to move the saddle 7 horizontally. When the shaft 5 is turned in one direction the saddle 7 is moved toward said shaft; and when turned in the opposite direction the saddle 7 is moved toward the opposite end of the cross-beam. By this means the cutting-tool $o$ receives the desired motion in a horizontal direction. The rising and falling motion is communicated to the cutting-tool by means of the lever $1^a$, to which is attached a quadrant, $2^a$, similar to the quadrant 2, but arranged in an opposite direction. To the quadrant $2^a$ is attached one end of a chain, $3^a$, which passes around a guide-pulley, suitably arranged on or near the base of the machine, and thence around, and has its other end attached to, a pulley, $4^a$, on a horizontal shaft, $5^a$, having its bearings in the standards $b$ $b$. Near the ends of the shaft $5^a$ are two pinions, $6^a$ $6^a$, which mesh into two vertical racks, $7^a$ $7^a$, attached to, and extending upward from the cross-beam C, and provided with bearings in the standards $b$ $b$. The lever $1^a$ is arranged at the opposite side of the bed A from the lever 1, and is provided with a friction-pulley, which bears against the inner edge of the pattern B. As the bed A is moved in its seat the pressure of the edge of the pattern against the lever $1^a$ causes said lever to vibrate, and, through the quadrant $2^a$, chain $3^a$, and pulley $4^a$, to rotate the horizontal shaft $5^a$, and thus raise or lower the cross-beam C through the engagement of the pinions $6^a$ and racks $7^a$. By this means the cutting-tool $o$ receives the desired motion in a vertical direction. The friction-rollers, with which the levers 1 and $1^a$ are provided, are adjustable at various distances from the centers of oscillation of said levers, by which means the desired degree of oscillation is imparted thereto. The work to be operated upon is carried by a bed or platform, arranged to travel to and fro under the cutting-tool.

It will be evident that the developing form or pattern surface may be made of any suitable material, and in one or more pieces, which may be fixed in one or in different parts of the machine, according to the combination of the machinery and the form to be worked.

Having now described the nature of my invention and the manner of carrying the same into practice, I would remark that I am aware that there is no novelty in reproducing copies of objects and designs by self-acting machinery in which a fac-simile of the object or design to be produced is employed, and which acts as a guide to govern the movements of the cutting-tools.

I am aware that there is no novelty in producing longitudinal forms from unequal surfaces; but

What I claim is—

The combination, in a machine for cutting and working stone, &c., of a reciprocating work-carrying bed, a pattern, a tool-carrying cross-beam, a tool-holding saddle arranged on said cross-beam, and an intermediate mechanism, substantially as described, for imparting a rising and falling motion to the cross-beam, and a longitudinal movement to the tool-saddle, as and for the object specified.

W. H. THOMPSON.

Witnesses:
J. G. TONGUE,
34 *Southampton Buildings, London, W. C.*
G. F. WARREN,
17 *Gracechurch street, London.*